June 16, 1942.      H. F. GORSUCH      2,286,537
HYDRAULIC MOTOR
Filed Aug. 30, 1937      5 Sheets-Sheet 1
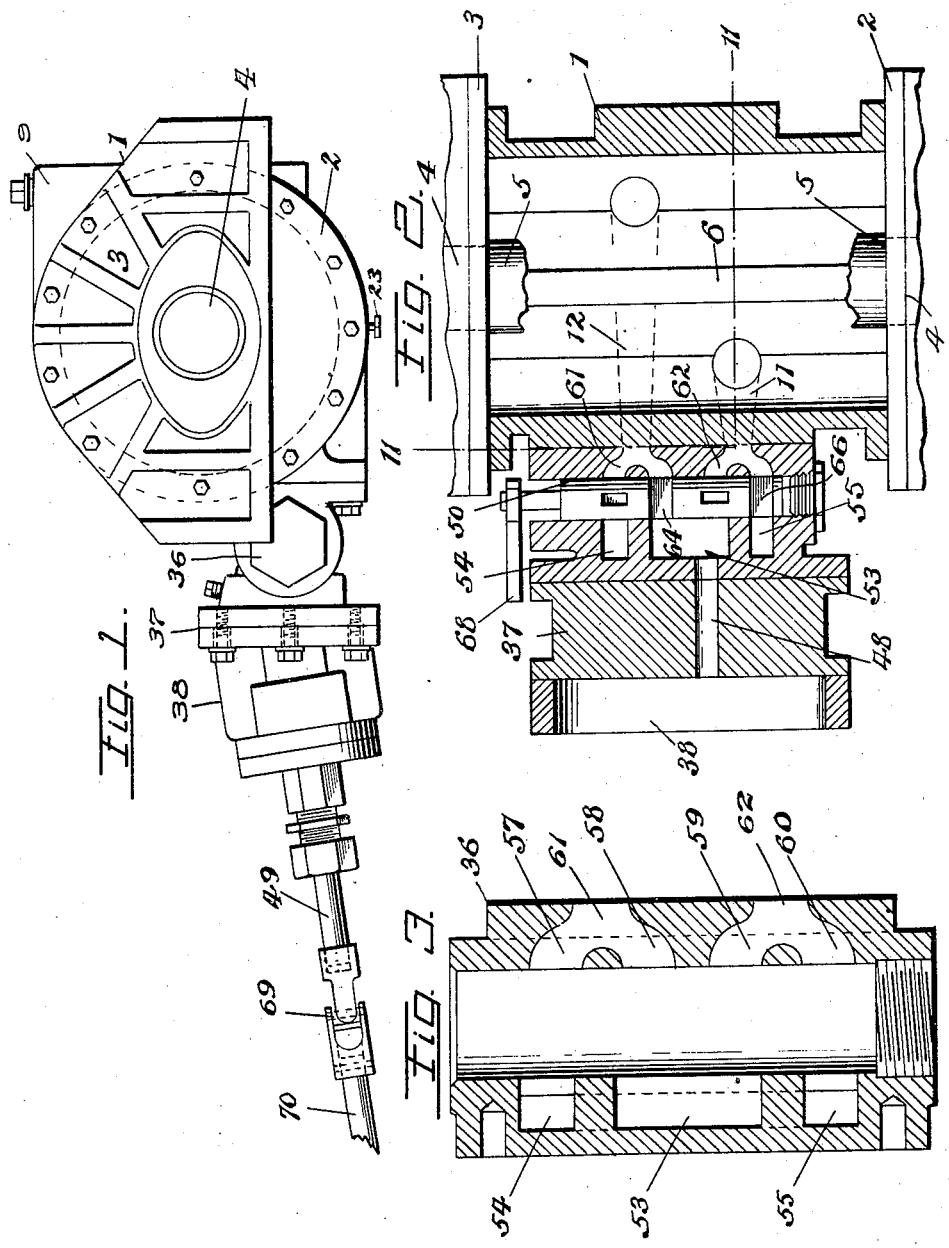
Inventor
Howard F. Gorsuch
By Gould & Gould
Attorney

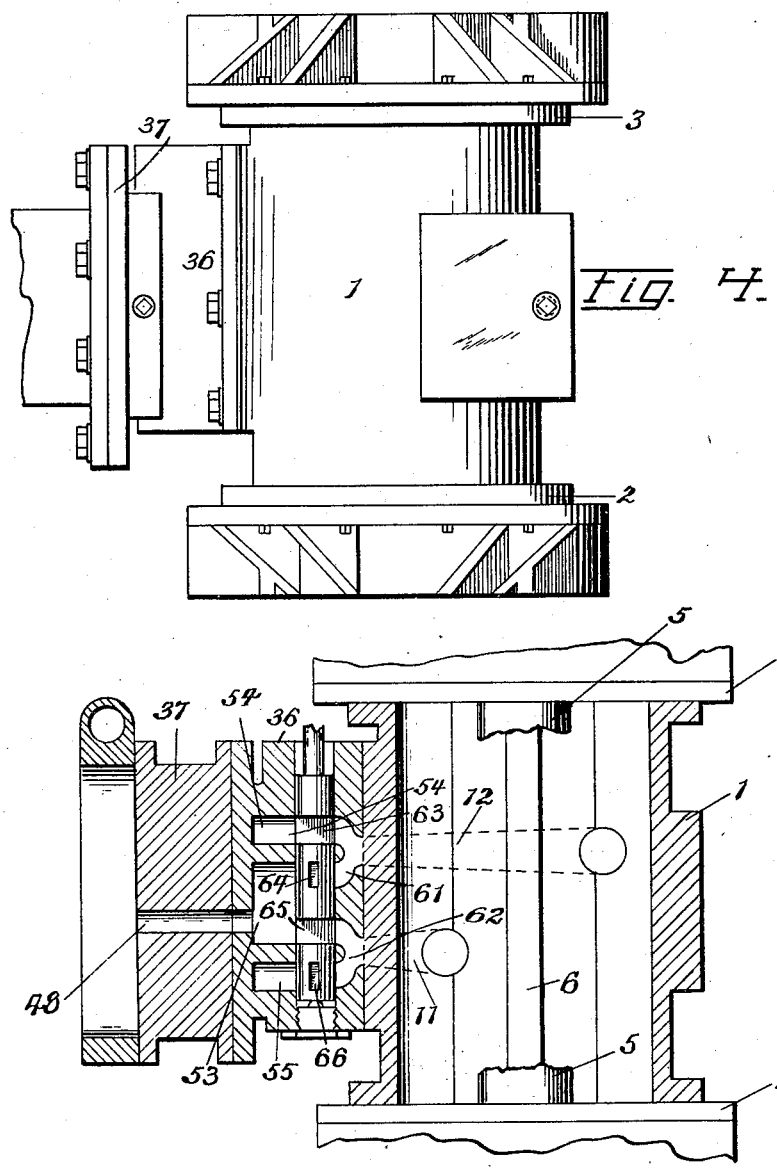

June 16, 1942.　　H. F. GORSUCH　　2,286,537
HYDRAULIC MOTOR
Filed Aug. 30, 1937　　5 Sheets-Sheet 3
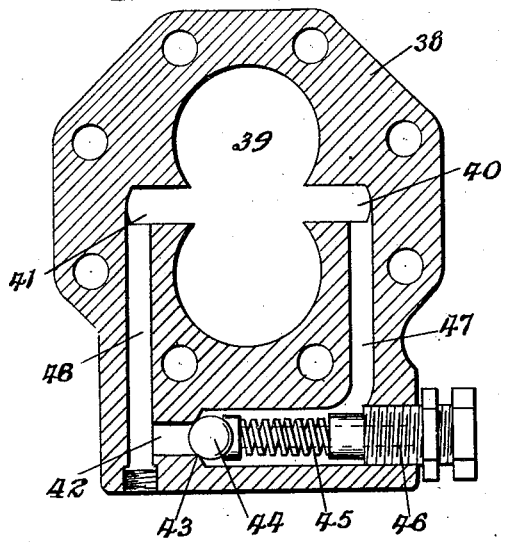
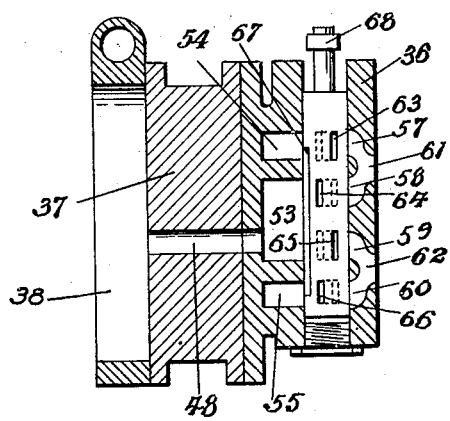
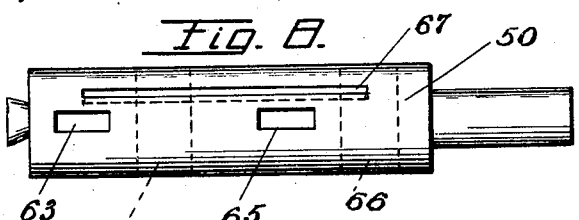
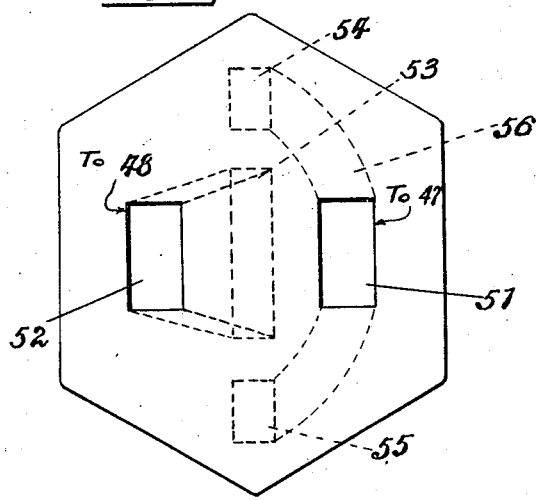
Inventor
Howard F. Gorsuch
By Gould & Gould
Attorney Inventor
Howard F. Gorsuch
By Gould & Gould
Attorney

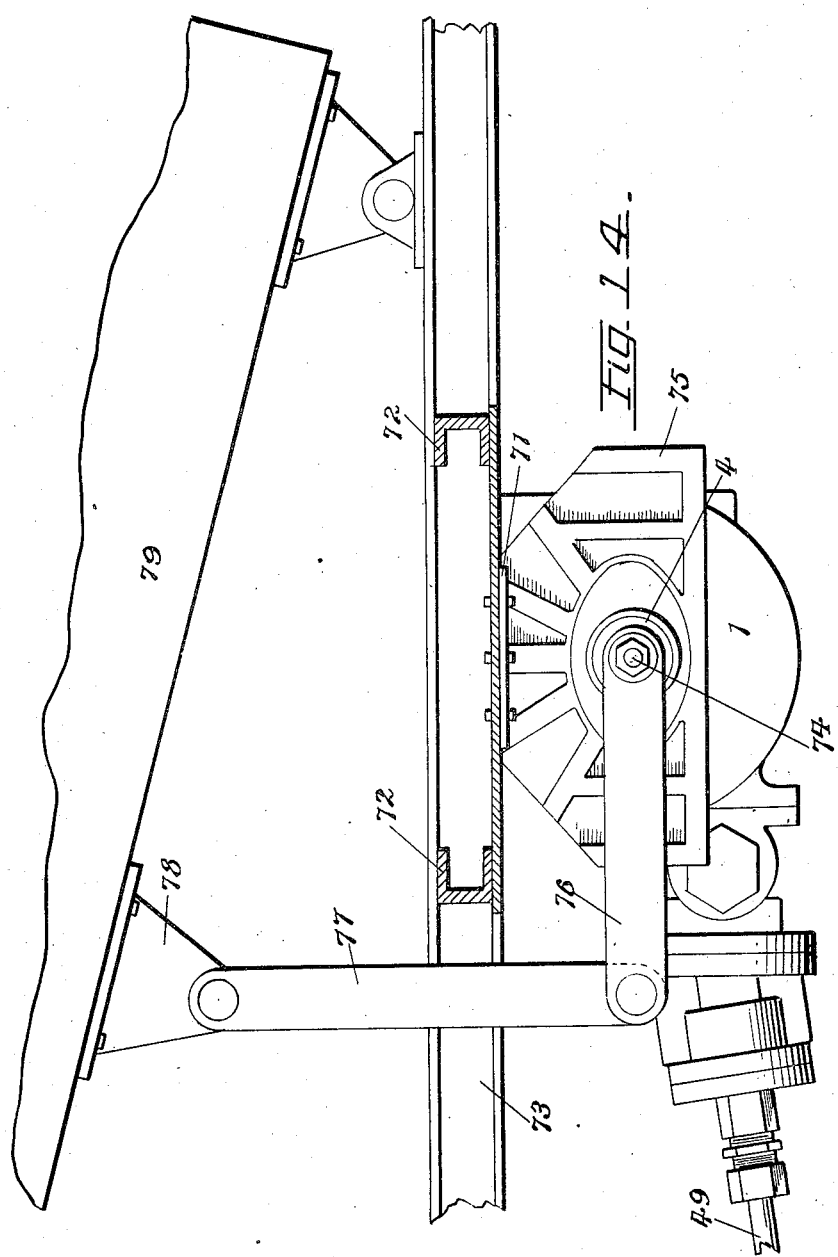

Patented June 16, 1942

2,286,537

UNITED STATES PATENT OFFICE 2,286,537

HYDRAULIC MOTOR

Howard F. Gorsuch, Mansfield, Ohio, assignor of one-half to Philip Fupre, Mansfield, Ohio Application August 30, 1937, Serial No. 161,662

3 Claims. (Cl. 121—38)

This invention is directed to an improvement in hydraulic motors designed to be used as a power element and controllable at will for power production.

The invention combines with the hydraulic motor proper a pressure generator for maintaining a constant unidirectional flow of motive fluid to the motor, with manually-operable means for directing the flow of motive fluid in either direction to and within the motor to provide power operation in either direction.

An essential object of the invention is the provision of manually-controlled means whereby the power of the pressure generator, to the limit of its power output, may be limited to any degree in its power effect on the motor in one direction of movement, whereby the power stroke of the motor in one direction may be set within the limits of the duty required of the particular motor.

The improved hydraulic motor, which is of the rotary oscillatory type, is driven by the pressure generator under power in either direction, a controlled by-pass serving to limit power application on the motor in one direction, with the motive fluid operating in a continuous closed cycle, and the exhaust from the motor being freely permitted.

The invention further contemplates the provision of a compact unit including a pressure generator, preferably a unidirectional, continuous-flow pump, a manually-controlled valve in open communication with the pump, and a motor proper in open communication with the valve, the motor including a rotor having a radially-extending vane or impeller, with the valve selectively operable to direct the fluid flow from the pump to either side of the impeller at will.

An important object of the invention is the provision of a by-pass valve, designed to be manually adjusted, to limit at will the power application of the motive fluid on one side of the impeller, to thereby preset the power of the motor in one direction at any degree within the limits of the pump.

The unit as a whole is designed particularly for use as a means for raising and lowering the body of a dump wagon and for permitting the use of such body as a hydraulic jack or like purpose, wherein the unit is compact, is supported on the vehicle frame, is driven from the power plant of the vehicle, and the valve controlled from the driver's seat; but it is to be understood that the unit, as such, is admirably adapted and designed for use with any road constructing vehicles or other types, wherein a part or parts are designed to be lifted or lowered or otherwise operated in different directions.

The invention is illustrated in the accompanying drawings, in which:

Fig. 1 is a view in side elevation of the improved hydraulic motor unit.

Fig. 2 is a horizontal sectional view of the same, the pump elements being omitted.

Fig. 3 is a horizontal section of the valve casing, the valve being omitted.

Fig. 4 is a plan view of the motor and valve casing.

Fig. 5 is a view similar to Fig. 2, the valve being shown in a position reversed from that in Fig. 2.

Fig. 6 is a vertical sectional view of the pump casing, the pump elements being omitted.

Fig. 7 is a view in section, showing the pump casing, intermediate member, valve casing and valve, the valve being in a neutral position.

Fig. 8 is a view in elevation of the valve.

Fig. 9 is a transverse sectional view of the valve.

Fig. 10 is a face view from the motor side of the intermediate member.

Fig. 14 is a view in elevation, partly in section, showing the application of the hydraulic motor to a dump wagon.

Figure 11:
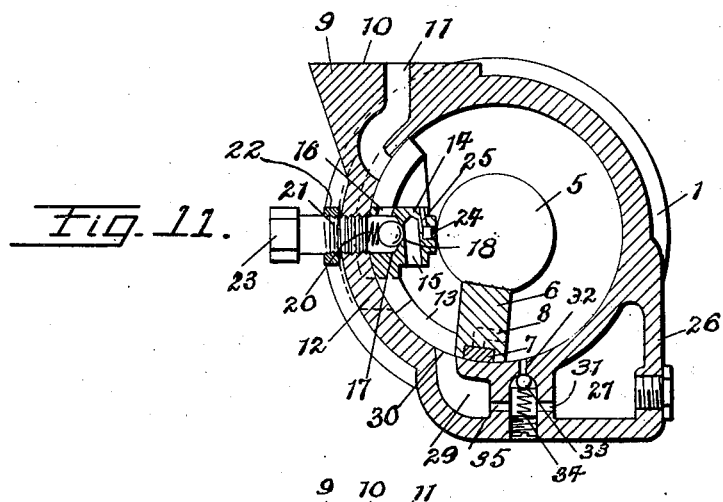
Fig. 11 is a vertical sectional view of the motor proper through the passage 11, the impeller being shown in fully-operated position under pump power in one direction.

The motor proper, as more particularly illustrated in Figs. 1, 2, 11, 12, and 13, comprises a casing 1, having removable end walls 2 and 3, in which latter is rotatably supported a shaft 4, which within the motor casing is enlarged to provide a rotor 5. To the rotor is secured a radial wing, hereinafter referred to as the impeller 6. The end of the impeller is recessed to receive a sealing strip 7 to bear against the wall of the casing, the impeller having a channel 8, opening into the casing and leading to the inner surface of the sealing strip, to permit the motive fluid under pressure to insure sealing contact of the strip 7.

Figure 12:
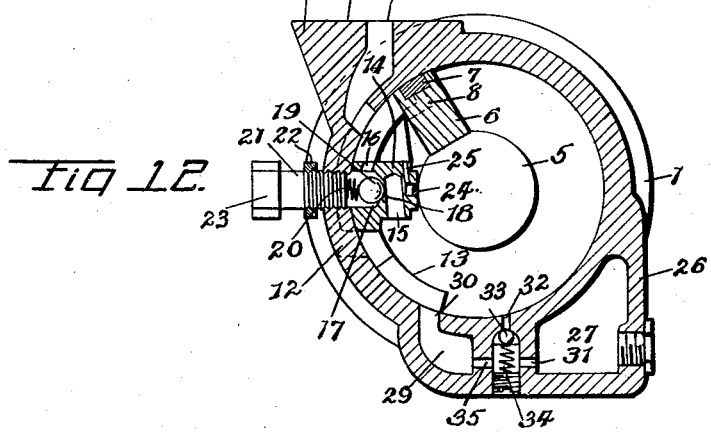
Fig. 12 is a similar view with the impeller in fully operated position under pump power in the opposite direction.
Figure 13:
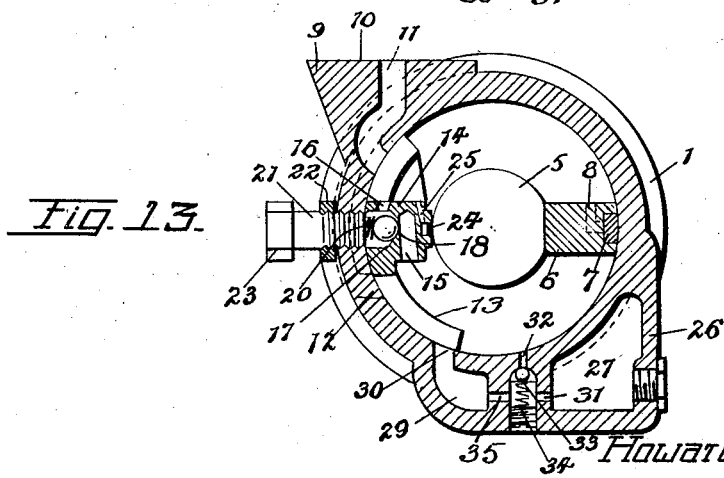
Fig. 13 is a similar view with the impeller in an intermediate position.

The casing 1 is provided with an enlargement 9, having a flat outer face 10. The enlargement is formed with spaced passages 11 and 12, opening through the face 10, and leading into and opening within the casing 1 at spaced points. The passage 11 leads through the wall of the casing 1, while the passage 12 leads through the wall of the casing and opens into the casing at a point below the passage 11. The inner surface of the casing 1 is formed with an abutment 13 of appreciable length, which limits movement of the impeller in both directions, and the passages 11 and 12 open into the casing within the length of this limiting abutment. Thus, with the impeller at one limit, as indicated in Fig. 12, the passage 11 is so located as to admit power fluid to move the impeller in one direction, while with the impeller at the opposite limit of movement, as indicated in Fig. 11, the passage 12 is so located as to admit power fluid to drive the impeller in the opposite direction.

An abutment 14 extends within the casing 1, intermediate the length of the abutment 13, such abutment having a passage 15 opening toward the casing inlet of passage 12, a second passage 16 opening toward the casing inlet of passage 11, and a lateral passage 17 connecting the passages 15 and 16. The passage 17 is formed as a valve seat 18, and a spring-pressed ball valve 19 is arranged to cooperate with such seat 18. The tension of the spring 20 holding the valve 19 to its seat is provided by a plunger 21, threaded in an extension 22 of the casing with an appropriate head 23, accessible from the exterior of the casing 1. This assembly constitutes, as will later appear, a manually controlled by-pass for governing the degree of operating pressure admitted to the casing for operating the impeller in one direction. It is of course to be understood that in the commercial development the seating pressure of the valve 19 is to be regulated by the desired power on the impeller for the particular work for which the motor is to be used, and further that this valve is set, and the setting sealed or secured at the factory. However, it will be particularly noted that as the setting or controlling plunger extends to the exterior of the casing, any necessary adjustment for power adjustment may be readily and conveniently made without dismantling, removing any part, or disconnecting any elements of the motor. This is particularly important in block tests of the motor, as when during such tests the power admission as controlled by the by-pass is found too high, or insufficient to meet specifications or tend to rupture of the parts, immediate adjustments may be made without even removing the motor from the testing apparatus.

The inner end of the abutment 14 is formed to receive a sealing strip 24, bearing on the rotor 5 to prevent leakage past the abutment, and this seal is open to the motive fluid through passage 25, to maintain the seal.

The casing 1 is formed with a second enlargement 26, formed to provide a reserve reservoir 27, communicating with the interior of the casing through a passage 28, and obviously serving to replenish oil or other motive fluid as needed. When the supply within the motor needs replenishing the suction of the rotor draws oil from the reserve reservoir 27, through openings 35 into chamber 29, and through passage 30 to the extent required. The remaining portion of the enlargement 26 is formed as an exhaust by-pass for the motive fluid in the movement of the impeller in one direction. This by-pass includes a chamber 29 opening through a port 30 into the casing immediately adjacent the end of the abutment 13, and a tubular passage 31 arranged between the reservoir 27 and the chamber 29, and in communication with the reservoir and chamber through passages 35. The inner end of the tubular opening is in communication with the interior of the casing through a passage 32, formed as a valve seat to receive a ball valve 33, with the latter adjustably held in place by a spring and bolt 34, operable from the exterior of the casing. The valve 33 opens outwardly from the casing only and will not permit flow into the casing. The tubular opening 32 is in communication with the chamber 29 through a passage 35. Thus in movement of the impeller in one direction, as from the position shown in Fig. 12 to the position shown in Fig. 11, the motive fluid after the impeller reaches its position in Fig. 11 will by-pass around the impeller, which such by-pass is automatically sealed under flow of motive fluid under pressure in the opposite direction.

Secured to the face 10 of the enlargement 9 of the motor casing 1 is a valve casing 36, and secured to the valve casing 36 is an intermediate member 37, forming in effect an enlargement of one wall of the pump casing 38. The pump casing 38, as shown more particularly in Fig. 6, is formed at 39 to receive the pressure creating elements, preferably conventional cooperating gears, which are not illustrated for the sake of clearness. The intake passage is indicated at 40 and the outlet or pressure passage at 41. The wall of the casing is formed with a passage 42, establishing communication between the pump intake and outlet, formed in the horizontal portion with a valve seat 43, with which cooperates a ball valve 44, opening in the pump intake direction, and held adjustably seated under a spring 45, controlled by a threaded stem 46, the passage 42 having a plug closed outlet in advance of the valve. The pressure seating of the valve 44 controls the outlet pump pressure, as excess pressure by-passes the motive fluid to the inlet.

The enlargement 37 of the pump wall is formed with two direct passages, one 47 leading to the inlet of the pump and the other 48 leading to the pump outlet. In other words these passages 47 and 48 form the pump inlet and pump outlet. This enlargement provides for bearing of the shafts of the gears at one end, one such shaft, indicated at 49 in Fig. 1, extending beyond the opposite wall of the pump as a drive shaft for the pump.

The valve casing 36, is formed with a longitudinal bore to receive a rotary valve 50, and on the face next to the intermediate member or pump enlargement is formed with two openings 51 and 52, which communicate directly with the passages 47 and 48 in such member. The wall of the valve bore toward the pump is formed with a central opening 53, and with smaller openings 54 and 55 beyond the respective ends of the opening 53. The passage 48, forming the pressure outlet from the pump leads directly to the central opening 53 in the bore of the valve casing, while the passage 47, forming the return or inlet passage to the pump, communicates by lateral passages 56 to both openings 54 and 55. This is illustrated more particularly in Fig. 10.

The opposite side of the wall of the valve bore is formed with two spaced openings 57 and 58 at one end and two similar openings 59 and 60 at the opposite end. These respective sets of openings are so arranged that the openings 57 and 60 are in line with the openings 54 and 55, while the openings 58 and 59 are in line with the central opening 53. The openings 57 and 58 merge in a single passage 61 leading to and in direct communication with the passage 12 of the motor casing, while the openings 59 and 60 merge into a single passage 62 having direct communication with the passage 11 of the motor casing.

A rotary valve 50 is mounted for rotation in the valve bore, being appropriately mounted and sealed against end leakage. This valve is formed with pairs of through passages 63 and 64 at one end, and 65 and 66 at the opposite end, as indicated more particularly in Fig. 8. The openings in the valve are similarly arranged at the respective ends of the valve, the openings 63 and 65 being in the same plane longitudinally of the valve, while the openings 64 and 66 are in a plane at right angles to the plane of openings 63 and 65. The openings 63, 64, 65, and 66 are so disposed longitudinally of the valve that in one position of the valve, as in Fig. 2, the opening 64 establishes communication between the pressure opening 53 and the motor casing passage 12 through opening 58 in the valve casing, while opening 66 in the valve establishes communication with the opening 55 in the wall of the valve bore, and with the opening 60 and thence to the passage 11 of the motor casing. In another position of the valve, as in Fig. 5, the valve opening 63 establishes communication between the openings 54 and 57 to passage 12 in the motor casing, while valve opening 65 establishes communication between the central opening 53 and opening 59 and thus to passage 11 in the motor casing.

Thus in one position of the valve, for example as in Fig. 5, the pump pressure is being directed through passage 11 of the motor casing, while in valve position shown in Fig. 2, the pump pressure is being directed through passage 12. In the first instance the passage 12 is the return passage, while passage 11 is the return passage in the second instance. The valve is of course adapted for a neutral position, where the valve ports are out of registry with any openings. Under these circumstances the impeller is held in the position occupied when the valve is moved to neutral position, and the load correspondingly held. To by-pass motive fluid under these circumstances, the valve is formed with a longitudinal ranging channel 67, shown in Fig. 8, which establishes communication between all openings 53, 54, and 55.

The valve is provided at one end with a lever connection 68, which is designed to be connected to an operating rod, not shown leading to the vicinity of the driver's seat, when the motor unit is used on a moving vehicle for convenient adjustment of the valve. The drive shaft 49 of the pump may be connected, as through a universal connection 69, with a shaft 70, operated from the power plant of the vehicle or other source.

In the operation of the unit, it will be apparent that assuming the impeller to be in the position shown in Fig. 12, and the valve turned in the position shown in Fig. 5, motive fluid under pressure of the pump will be admitted to the passage 11 of the motor casing, driving the impeller and rotor toward and into the position shown in Fig. 11. The motive fluid in advance of the moving impeller will return to the pump inlet through the passage 12. When the impeller has reached the position shown in Fig. 11, the motive fluid under pressure cannot further affect the impeller, as the latter is in one limit position in contact with the abutment 13. However such fluid now by-passes past the valve 33, through passage 35, into chamber 29, through port 30, thus passing around the impeller and reaching the passage 12.

With the valve turned to the opposite operative position, as in Fig. 2, the motive fluid under pressure will enter the passage 12 of the motor casing and tend to force the impeller toward and into the position shown in Fig. 12. During this pressure movement of the motive fluid, there is a pressure by-pass through the valve controlled passages 15, 16, and 17, and the flow resistance through this passage is determined by the setting of the valve 19. If this valve is set for a lower pressure than the normal flow pressure, as is usually the case, the return movement of the impeller will be under such pressure, as any higher pressure will cause the motive fluid to by-pass the valve. Thus the return movement of the impeller, or more particularly the pressure causing the return movement, is readily and conveniently controlled by the setting of the valve 19.

In Figure 14 the improved hydraulic motor is shown in combination with a dump wagon. Here the motor unit is connected to a plate 71 mounted on a strut frame 72 which is connected to the chassis frame bars 73. The rotor shaft 74 of the motor extends beyond the removable reinforced ends 75 of the motor casing and a lever arm 76 is connected to each end of the shaft. The lever arms 76 are pivotally connected to similar lever arms 77 which are in turn connected through pivotal units 78 to the dump body 79, which latter is of course pivotally supported on the chassis in rear of the lever connection.

The pump shaft extends forwardly and is connected through a transmission means or other connection to be driven at selective speeds through lever control at the driver's seat. These details are conventional and require no specific illustration herein. The rod connected to and operating the arm 68 extending from the valve also extends forwardly to the driver's seat, so that the valve may be controlled from the driver's seat for the various functions previously described.

Obviously, power admitted to the motor will elevate the dump wagon body and where such dump wagon body is designed to be used as a hydraulic jack by connecting elements to the rear end of the body beyond the pivotal support of the body on the chassis, the hydraulic motor may be driven under a selective pressure or power to operate the dump body in the downward direction.

Obviously also the means for mounting the dump wagon body for mounting the motor with respect to the chassis of the vehicle and for connecting the motor to the dump wagon body to secure the desired result may be varied within the scope of the appended claims.

What is claimed to be new is:

1. A hydraulic motor including a casing, a rotor extending axially of the casing, an impeller carried by the rotor and having non-leading contact with the interior surface of the casing, an abutment in the casing to limit movement of the impeller in both directions, a first pressure-fluid passage opening into the casing near one end of the abutment, a second fluid pressure passage opening into the casing near the opposite end of the abutment, a valve block secured within the casing between the ends of the abutment and having non-leaking bearing on the rotor, a passage through the valve block in communication with the interior of the casing on both sides of said block, said passage including a valve seat, a valve cooperating with said seat, and means operable from beyond the casing for controlling said valve, said valve controlling the operative pressure influence of the fluid pressure through one of said passages on the impeller without correspondingly affecting the fluid pressure on the impeller through the other of said passages.

2. A hydraulic motor including a casing, a rotor extending axially of the casing, an impeller carried by the rotor and having non-leaking connection with the casing, an abutment secured within the casing to limit movement of the impeller in both directions, fluid-pressure passages opening into the casing near the respective ends of the abutment, and manually-controlled means arranged in the casing between the respective ends of the abutment for controlling the operative influence on the impeller of the fluid under pressure through one such passage without correspondingly controlling the impeller influence of the fluid pressure through the other such passage, said manually controlled means including a spring-pressed valve, and a member operable from the exterior of the casing for controlling the spring pressure on the valve.

3. A hydraulic motor including a casing, a rotor extending axially of the casing, a vane-like impeller carried by the rotor and moving in non-leaking contact with the inner surface of the casing, means in the casing for limiting the movement of the impeller in each direction to a distance less than the full circumference of the casing, the casing being formed with two passages leading into the casing within the respective ends of the limiting means, a prime mover for delivering a motive fluid under constant pressure to the casing, means for selecting either passage in the casing for the fluid under pressure and the other passage as the fluid return from the casing to the prime mover, means within the casing for governing the fluid flow through one casing passage in either use as a pressure passage or return passage, said means being without effect on the fluid flow through the other such casing passage under any conditions, and a manually operable member for selectively controlling the governing means and actuated entirely from the exterior of the casing.

HOWARD F. GORSUCH.